(12) United States Patent
Chen

(10) Patent No.: US 8,480,889 B2
(45) Date of Patent: Jul. 9, 2013

(54) CHROMATOGRAPHIC STATIONARY PHASE

(75) Inventor: Wu Chen, Newark, DE (US)

(73) Assignee: Agilent Technologies, Inc., Santa Clara, CA (US)

( * ) Notice: Subject to any disclaimer, the term of this patent is extended or adjusted under 35 U.S.C. 154(b) by 1227 days.

(21) Appl. No.: 11/412,564

(22) Filed: Apr. 27, 2006

(65) Prior Publication Data

US 2007/0251869 A1    Nov. 1, 2007

(51) Int. Cl.
*B01D 15/08* (2006.01)

(52) U.S. Cl.
USPC ............... 210/198.2; 210/502.1; 210/635; 210/656

(58) Field of Classification Search
USPC ........... 210/198.2, 635, 656, 502.1; 502/401
See application file for complete search history.

(56) References Cited

U.S. PATENT DOCUMENTS

| 5,094,960 | A | * | 3/1992 | Bonomo | 436/178 |
| 5,134,110 | A | * | 7/1992 | Sudo et al. | 502/401 |
| 5,194,333 | A | * | 3/1993 | Ohnaka et al. | 428/405 |
| 5,204,005 | A | * | 4/1993 | Doran et al. | 210/656 |
| 5,252,766 | A | * | 10/1993 | Sakakura et al. | 556/430 |
| 5,869,724 | A | * | 2/1999 | Kirkland et al. | 556/410 |
| 5,948,531 | A | | 9/1999 | Kirkland et al. | |
| 6,159,540 | A | | 12/2000 | Menon et al. | |
| 2001/0023848 | A1 | * | 9/2001 | Gjerde et al. | 210/635 |
| 2004/0227127 | A1 | | 11/2004 | Boswell et al. | |
| 2005/0242038 | A1 | | 11/2005 | Chen | |
| 2006/0000773 | A1 | | 1/2006 | Glennon et al. | |
| 2007/0095736 | A1 | * | 5/2007 | Malik et al. | 210/198.2 |

FOREIGN PATENT DOCUMENTS

| WO | 00/71246 A1 | 11/2000 |
| WO | 2005/095525 A1 | 10/2005 |
| WO | 2005/108292 A1 | 11/2005 |

OTHER PUBLICATIONS

Kirkland (Journal of Chromatography A, 762 (1997), pp. 97-112).*
Snyder, "Practical HPLC method development", 1997, pp. 190-191.*
GB Search Report, May 31, 2007.

* cited by examiner

*Primary Examiner* — Ernest G Therkorn
(74) *Attorney, Agent, or Firm* — Milstein Zhang & Wu LLC

(57) ABSTRACT

A novel chromatographic stationary phase for reversed-phase high performance liquid chromatography (HPLC) is provided. By using mono and dimethyl silanes as endcapping reagents as compared with the use of traditional trimethyl silanes, an improved blocking of unreacted surface silanols is achieved. The improved blocking of surface silanols results in at least better peak shape and more reproducible retention times in reversed-phase HPLC analyses.

3 Claims, 1 Drawing Sheet

CHROMATOGRAPHIC STATIONARY PHASE

FIELD OF THE INVENTION

The present invention relates to chromatographic stationary phases for use in liquid chromatography. More particularly, the present invention relates to chromatographic stationary phases for use in reversed-phase HPLC.

BACKGROUND

Silica particles are, by far, the most widely used supports for reversed-phase liquid chromatography stationary phases. The high mechanical stability, monodisperse particles, high surface area, and easily tailored pore size distributions make silica superior to other supports in terms of efficiency, rigidity, and performance. Silica bonding chemistry also allows for a wide variety of stationary phases with different selectivities to be made on silica.

Silanes are the most commonly used surface modifying reagents in liquid chromatography. For example, *An Introduction to Modern Liquid Chromatography*, Chapter 7, John Wiley & Sons, New York, N.Y. 1979; *J. Chromatogr.* 352, 199 (1986); *J. Chromatogr.* 267, 39 (1983); and *Advances in Colloid and Interface Science* 6, 95 (1976) each disclose various silicon-containing surface modifying reagents.

Typical silane coupling agents used for silica derivatization have general formula $EtOSiR_1R_2R_3$ or $ClSiR_1R_2R_3$, where R represents organic groups, which can differ from each other or all be the same. For reversed-phase chromatography, the silane coupling agent has traditionally been $—Si(CH_3)_2(C-18H_{37})$, where $C-18H_{37}$, octadecyl group, yields a hydrophobic surface. The reaction, when carried out on the hydroxylated silica, which typically has a surface silanol concentration of approximately 8 $\mu mol/m^2$, does not go to completion due to the steric congestion imposed by the R groups on the coupling agent.

To improve the quality of the original chemically bonded phase by blocking access to some residual silanol groups on the silica surface, the bonded phase is usually further endcapped using small organic silanes. The endcapping is usually carried out with compounds able to generate trimethylsilyl groups, $(CH_3)_3—Si—$, the most popular being trimethylchlorosilane (TMCS) and hexamethyldisilazane (HMDS). The majority of free surface silanols, which are under dimethyloctadecylsilyl group, cannot react with the endcapping because of steric hindrance. In the traditional endcapping step, only ~0.2 $\mu mol/m^2$ surface silanol groups are bonded based on the carbon loading data. The highest coverage attained in laboratory studies has been ~4.5 $\mu mol/m^2$, while the coverage available in commercial chromatography column is much less, usually on the order of 2.7-3.5 $\mu mol/m^2$, even after endcapping.

These residual surface silanols interact with basic and acidic analytes via ion exchange, hydrogen bonding and dipole/dipole mechanism. However, this secondary interaction between analytes and residual silanol groups creates problems, including increased retention, excessive peak tailing, especially at mid pH range for basic compounds, and irreversible adsorption of some analytes.

To overcome the problems of residual silanol activity, many methods have been tried such as the use of ultrapure silica, carbonized silica, coating of the silica surface with a polymeric composition, endcapping the residual silanol groups, and addition of suppressors such as long chain amines to the eluent. In practice, however, none of these approaches has been totally satisfactory. A general review of deactivating silica support is given by Stella et al. [*Chromatographia* (2001), 53, S-113-S115].

One method to eliminate surface silanols by extreme endcapping is described in U.S. Pat. No. 5,134,110. While the traditional endcapping can physically bond some residual silanol groups, at least 50% of the surface silanols remain unreacted. U.S. Pat. No. 5,134,110 describes an endcapping method of octadecyl-silylated silica gel by high temperature silylation. The polymeric chemically bonded phases originated from trichlorosilanes were endcapped using hexamethyldisilazane or hexamethylcyclo-trisiloxane at very high temperature, above 250° C., in a sealed ampoule. The resulting endcapped phases were shown to perform with excellence on the Engelhardt test. This result was explained by the formation of dimethylsilyl loop structures on the surface, leading to the elimination of silanols. This method had the disadvantage in that it was used on a polymeric phase, and polymeric phases usually have poor mass transfer and poor reproducibility. Also the high temperature of silylation in a sealed ampoule is not practical and difficult to perform, as commercially compared with the traditional liquid phase endcapping procedure.

Another method of reducing the effect of surface silanols is to introduce polar embedded groups in the octadecyl chain. These embedded groups, generally containing nitrogen atoms and amide such as in European Patent Application 90/302095.4, carbamate such as disclosed in U.S. Pat. No. 5,374,755, and most recently urea groups have shown that they can play an important role to minimize the undesirable silanol interactions. Phases with an incorporated polar group clearly exhibit lower tailing factors for basic compounds, when compared with traditional C-18 phases. Some mechanisms have been proposed, while some evidence leads to the belief that the surface layer of an embedded polar group phase should have a higher concentration of water due to the hydrogen bonding ability of the polar groups near the silica surface. This virtual water layer suppresses the interaction of basic analytes with residual surface silanols and permits separation with mobile phase having 100% water.

A disadvantage of this approach is that the presence of the water layer seems to contribute to a higher dissolution rate of the silica support, as compared to their alkyl C-8 and C-18 counterparts. In a systematic column stability evaluation by J. Kirkland, an embedded amide polar stationary phase was shown to be less stable. This result may be predictable, due to the higher water content near the underlying silica surface for polar embedded phases. The embedded polar groups also cause adsorption of some analytes when the phases are hydrolyzed or the phases are not fully reacted during phase preparation, leaving amine or hydroxyl groups on the surface. For example, the hydrolyzed amide phase leaves aminopropyl moieties on the surface, and can be strongly adsorb acidic and polar compounds, causing a peak to tail-off, or to be missing completely.

The polar embedded phases are also more hydrophilic than the traditional C-18 phases. The retention of the analytes is much less than on the traditional C-18 columns. As a result, the phase selectivity is quite different from traditional C-18, which causes a change in the order in which analytes elute relative to each other from the column. Consequently, methods developed on traditional C-18 columns cannot be transferred to polar embedded phase columns.

Another method for reducing the effect of surface silanols is to use a phase, which can sterically protect surface silanols. U.S. Pat. No. 4,705,725 to Du Pont describes that bulky diisobutyl (with C-18) or isopropyl (with C-8, C3, C14 amide) side chain groups (Zorbax®) Stable Bond reversed-phase columns) stabilize both long and short chain monofunctional ligands and protect them from hydrolysis and loss at low pH. The bulky side groups increase the hydrolytic stability of the phase. Such a moiety is less vulnerable to destruction at low pH, and better shields the underlying silanols. The sterically protected phases are extremely stable at low pH. The sterically protected silane phases are not endcapped; therefore, the loss of small, easily hydrolyzed endcapping reagents under acidic mobile phase condition is avoided. At pH<3, the phase has excellent performance, in terms of peaks, reproducibility, and lifetime. In this pH range, the silanol groups on a type B silica are nearly completely protonated, and as a result, they do not act as sites for secondary interaction. The coverage density is, however, much lower than for dimethyl ODS phases. The ligand density of diisobutyloctadecyl phase is ~2 µmol/m² when compared to the related classical dimethyloctadecyl phase with a ligand density of 3.37 mmol/m². U.S. Pat. No. 5,948,531 discloses the use of bridged propylene bidentate silanes or a bidentate C-18 phase (Zorbax® Extend-C-18 columns), to restrict analyte access to residual silanols by incorporating a propylene bridge between two C-18 ligands. The bidentate C-18 phase retains the benefits of monofunctional silane phases (high column efficiency, reaction repeatability) while demonstrating good stability in high and low pH mobile phases. Zorbax Stable-Bond C-18 (SB-C-18) and Zorbax Extend-C-18 columns also have very similar selectivity to the traditional C-18 columns.

Basic compounds appear in widely divergent areas, such as the environmental, chemical, food, and pharmaceutical industries. In the latter, in particular, over 80% of commercialized drugs are estimated to possess a basic function. Therefore, it is of crucial importance to develop practical HPLC stationary phases having minimized surface silanol activity.

SUMMARY OF THE INVENTION

The invention comprises a chromatographic stationary phase for use in reversed-phase high performance liquid chromatography (HPLC) comprising a silica support having bonded thereto via Si—O bonds at least one hydrophobic ligand and an endcapping silane selected from the group consisting of methyl hydrosilane, methyl dihydrosilane, dimethyl hydrosilane and mixtures thereof. In a specific embodiment, the chromatographic stationary phase according to the current invention comprises a silica support having bonded thereto via Si—O bonds at least one silane coupling agent of the formula I:

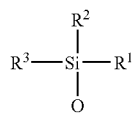

I wherein, $R^1$, $R^2$ and $R^3$ are independently hydrogen or $C_1$ to $C_{30}$ hydrocarbyl, provided that at least one of $R^1$, $R^2$ and $R^3$ is a $C_4$ hydrocarbyl or higher. The silica further has bonded thereto, via Si—O bonds, at least one end-capping silane selected from formulas II and III:

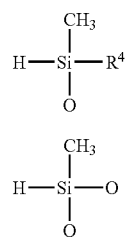

wherein, $R^4$ is hydrogen or methyl.

The current invention also provides a process for producing a chromatographic stationary phase for use in reversed-phase chromatography, comprising providing a silica support material having surface silanols and reacting the surface silanols with at least one silane coupling agent containing a hydrophobic ligand, then reacting residual surface silanols with at least one endcapping agent capable of generating mono-methyl or dimethyl hydrosilanes.

According to an embodiment of the invention, the process comprises reacting a silica support material having surface silanols with at least one silane coupling reagent having a formula IV;

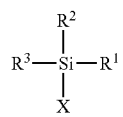

IV wherein $R^1$, $R^2$ and $R^3$ are as defined above, and X is halogen, $OR^5$ or $NR^6R^7$, wherein $R^5$ is $C_1$ to $C_{30}$ alkyl, and $R^6$ and $R^7$ are independently $C_1$ to $C_{30}$ alkyl, or hydrogen, to provide a functionalized silica support material having unreacted surface silanols. The unreacted surface silanols are subsequently reacted with at least one endcapping reagent having a formula selected from V, VI and VII;

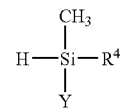

V

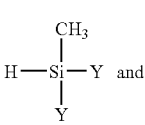

VI

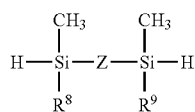

VII wherein, $R^4$ is as defined above, Y is halogen, $OR^5$ or $NR^6R^7$, $R^8$ and $R^9$ are independently hydrogen or methyl, and Z is nitrogen, oxygen or a covalent bond. The step of reacting the unreacted surface silanols with the at least one endcapping reagent is performed in an inert solvent, such as toluene, tetrahydrofuran or another inert hydrocarbon at reflux conditions. In the case that Y is a halogen, an acid scavenger, such as imidazole or pyridine is added to the reaction mixture.

DETAILED DESCRIPTION OF THE INVENTION

Figure 1A:
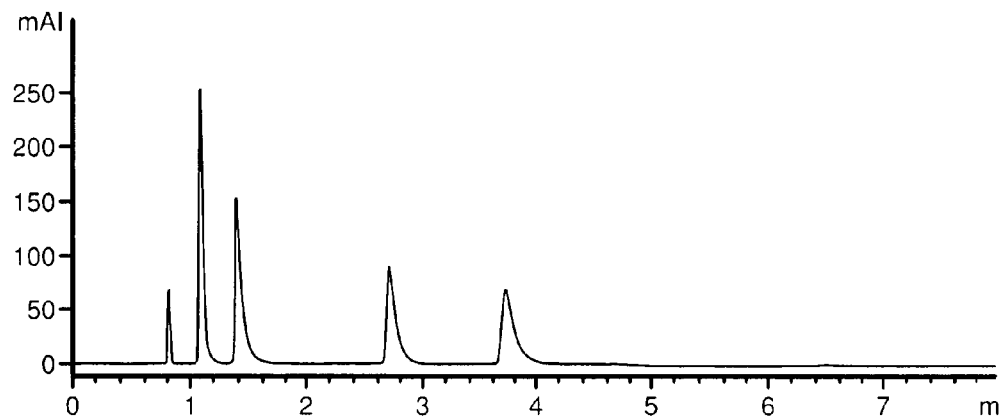
FIGS. 1A and 1B illustrate a comparison of chromatograms produced using a C-18 column endcapped using trimethyl silane (FIG. 1A) and a C-18 column endcapped with dimethyl silane according to the current invention (FIG. 1B).

The present invention provides a novel improvement to a chromatographic stationary phase for use in reversed-phase chromatography. It has been found that by using smaller silanes, mono and dimethyl hydrosilanes, instead of the traditional trimethyl silanes, as endcapping reagents for reversed-phase materials results in improved coverage of unreacted surface silanols, which in turn leads to improved peak shape and more reproducible analyte retention over time. Because the steric hindrance of the hydrophobic phase is less significant for the mono and dimethyl hydrosilanes, a greater percentage of the residual active silanols can be blocked.

According to the process of the current invention, the endcapping mono and/or dimethyl hydrosilanes are introduced to the chromatographic support following introduction of the hydrophobic phase. The endcapping is done in an inert solvent, such as toluene, tetrahydrofuran or another inert hydrocarbon, under reflux conditions according to methods that are well known in the art. The endcapping agent may be introduced using any silane capable of generating a mono or dimethyl hydrosilyl groups in solution at reflux.

The silane coupling agents used for the hydrophobic phase may contain any ligand commonly used in stationary phases for reversed-phase HPLC. For example, coupling agents according to the following formula I:

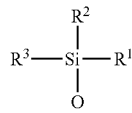

I wherein, $R^1$, $R^2$ and $R^3$ are independently hydrogen or $C_1$ to $C_{30}$ hydrocarbyl, provided that at least one of $R^1$, $R^2$ and $R^3$ is $C_4$ or higher hydrocarbyl. As used herein, the term hydrocarbyl means any ligand comprising a straight chain, branched or cyclic carbon backbone. Further, the ligand may contain one or more unsaturated moieties and in the case of cyclic moieties, may be aryl. Still further, the ligand me be substituted with any moiety commonly used in reversed-phase HPLC. Exemplary ligands used for stationary phases for reversed-phase HPLC include amides, carbamates, amines, phenyl, nitrites, butyl, octyl and octadecyl. For the purposes of the current invention the identity of the specific coupling agent is not critical, as the invention is applicable generally to reversed-phase chromatographic stationary phases.

Further the silane coupling agent used to create the hydrophobic phase may be introduced in any manner commonly known in the art. Typically, the hydrophobic phase is introduced by reacting the silica support having surface silanols with a silane having the general formula IV:

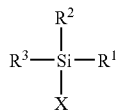

IV wherein $R^1$, $R^2$ and $R^3$ are defined as above, and X is halogen, $OR^5$ or $NR^6R^7$, wherein $R^5$ is $C_1$ to $C_{30}$ alkyl, and $R^6$ and $R^7$ are independently $C_1$ to $C_{30}$ alkyl or hydrogen. Typical methodologies for introducing the hydrophobic phase are described in Silane Coupling Agents: Connecting Across Boundaries, © 2004, published by Gelest, Inc., and available at www-dot-gelest-dot-com/company/pdfs/couplingagents-dot-pdf. The methods described therein are also useful for introducing the endcapping agent. The current invention does not depend on the manner in which the silane coupling agent is introduced, and it is contemplated that the current invention will be applicable to all conventionally known ways of introducing the silane coupling agent.

The unreacted surface silanols remaining following the introduction of the silane coupling agent above are subsequently reacted with at least one endcapping reagent capable of producing mono- or dimethyl hydrosilanes in an inert solvent under reflux conditions. Preferred endcapping reagents according to the current invention are silanes having a formula selected from V, VI and VII;

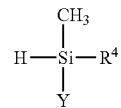

V

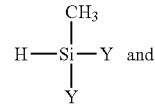

VI

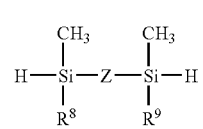

VII wherein, $R^4$ is hydrogen or methyl, and Y is halogen, $OR^5$ or $NR^6R^7$, wherein $R^5$ is $C_1$ to $C_{30}$ alkyl, and $R^6$ and $R^7$ are independently $C_1$ to $C_{30}$ alkyl or hydrogen, $R^8$ and $R^9$ are independently hydrogen or methyl, and Z is nitrogen, oxygen or a covalent bond. In the case that an endcapping agent according to formula VIII is used, the endcapping agent is capable of producing two Si—O bonds, and thus, occupies two unreacted surface silanols. Where Y is a halogen, an acid scavenger, such as imidazole or pyridine is added to the reaction mixture. When bonded to the silica, the endcapping agents have formulas selected from II and III:

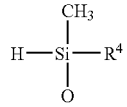

II

-continued

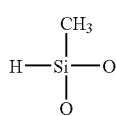

wherein the oxygen atoms form the bond to the support material.

Example 1

Bonding XDB-C-18 (batch 1369.29A): XDB-C-18 phase was bonded to silica under reflux condition in toluene. After reaction, the silica was filtered, washed with toluene, THF, acetonitrile, and dried under vacuum at 120° C. for at least 2 hours. Analysis result: % C is 13.93-13.91; % H is 2.66-2.71.

Endcapping of XDB-C-18 (batch 1369.39B): 7.73 g of the above resulting silica (1369.39A) was charged into a 250 ml three necked flask equipped with a Barrett trap with a water condenser on it. Then 61 ml toluene was added. Subsequently, 30 ml toluene was distilled-out, and collected in the Barrett trap. After the mixture was allowed to cool below 100° C., the Barrett trap was removed, and a new water condenser was put on. A charge of 3.67 g (dimethylamino)dimethylsilane was added. The mixture was then stirred under reflux condition overnight (~18-24 hours). The silica was filtered, washed with toluene, THF, acetonitrile, and dried under vacuum at 120° C. for at least 2 hours. Analysis result: % C is 13.96-13.97; % H is 2.72-2.68.

Example 2

Figure 1B:
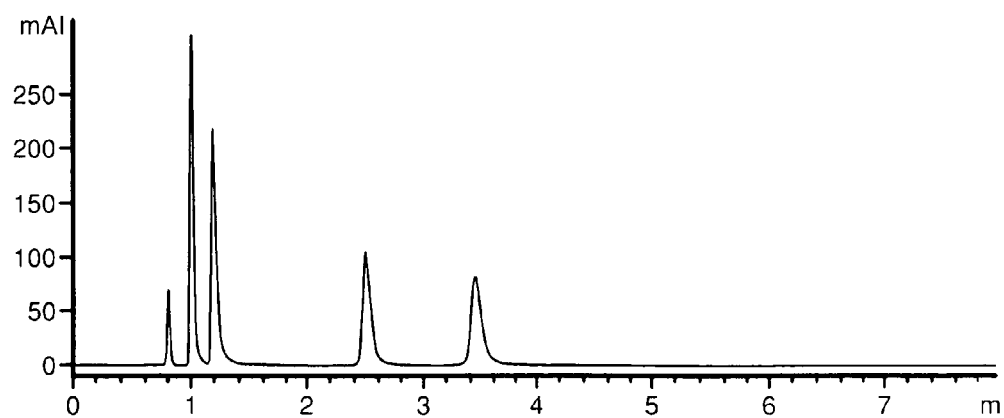

A comparison of a reversed-phase C-18 column endcapped with a dimethyl hydrosilane according to the current invention with a similar reversed-phase C-18 column endcapped with a traditional trimethyl silane was performed. Five typical analytes were eluted using a mobile phase comprising 40% 20 mM phosphate, pH 7.0 and 60% acetonitrile. The dimensions of each column were 4.6×100 mm. The flow rate was set to 1.0 mL/min with a column temperature of 24° C. The analytes used were (1) uracil, (2) propranolol, (3) nortiptyline, (4) imipramine and (5) amitriptyline. Referring to FIG. 1A, as shown, a chromatogram generated using the C-18 column end-capped with a trimethyl silane. FIG. 1B shows a chromatogram produced using the C-18 column end-capped with a dimethyl hydrosilane.

As can be seen from the figures, the column endcapped with dimethylsilane according to the present invention provides peaks with less tailing, indicating better coverage of the unreacted surface silanols. The tailing factors for each peak in FIGS. 1A and 1B are detailed in Table 1 below.

TABLE 1

| Analyte | Trimethylsilane Endcapping | Dimethylsilane Endcapping |
|---|---|---|
| Uracil | n/a | n/a |
| Propranolol | 2.09 | 1.58 |
| Nortiptyline | 3.56 | 2.47 |
| Imipramine | 2.38 | 1.54 |
| Amitriptyline | 2.53 | 1.64 |

The present invention has thus been described with reference to specific non-limiting examples. The full scope of the present invention will be apparent from the appended claims.

What is claimed is:

1. A chromatographic stationary phase, comprising a silica support having bonded thereto, via Si—O bonds, at least one silane coupling agent of the formula I:

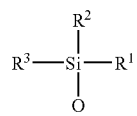

wherein, $R^1$, $R^2$ and $R^3$ are independently hydrogen or $C_1$ to $C_{30}$ hydrocarbyl, provided that at least one of $R_1$, $R_2$ and $R_3$ is a $C_4$ hydrocarbyl or higher, and bonded thereto, via Si—O bonds, at least one end-capping silane selected from formulas II and III:

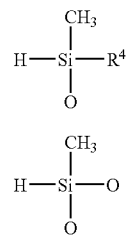

wherein, $R^4$ is hydrogen or methyl.

2. A chromatographic stationary phase for use in reversed-phase chromatography comprising a silica support having bonded thereto, via Si-0 bonds, at least one hydrophobic ligand and an endcapping silane selected from the group consisting of methydihydrosilane, methylhydrosilane, dimethylhydrosilane and mixtures thereof.

3. A chromatographic stationary phase according to claim 2, wherein the stationary phase is useful for high performance liquid chromatography.

* * * * *

UNITED STATES PATENT AND TRADEMARK OFFICE
CERTIFICATE OF CORRECTION

| | |
|---|---|
| PATENT NO. | : 8,480,889 B2 |
| APPLICATION NO. | : 11/412564 |
| DATED | : July 9, 2013 |
| INVENTOR(S) | : Wu Chen |

Page 1 of 1

It is certified that error appears in the above-identified patent and that said Letters Patent is hereby corrected as shown below:

In the Claims

In column 8, line 46, In Claim 2, delete "Si-0" and insert -- Si-O --, therefor.

In column 8, line 48, In Claim 2, delete "methydihydrosilane," and insert -- methyldihydrosilane, --, therefor.

Signed and Sealed this
Twenty-fourth Day of September, 2013

Teresa Stanek Rea
*Deputy Director of the United States Patent and Trademark Office*